United States Patent [19]

Tsuji et al.

[11] Patent Number: 5,202,042

[45] Date of Patent: Apr. 13, 1993

[54] HETEROCYCLIC ELECTROLYTE SALTS FOR ELECTROLYTIC CAPACITORS

[75] Inventors: Tatsunori Tsuji; Makoto Shimizu; Fumihiko Shinozaki; Yutaka Yokoyama, all of Tokyo, Japan

[73] Assignee: Nippon Chemi-Con Corporation, Tokyo, Japan

[21] Appl. No.: 725,344

[22] Filed: Jul. 3, 1991

Related U.S. Application Data

[63] Continuation of Ser. No. 330,605, Mar. 29, 1989, abandoned, which is a continuation-in-part of Ser. No. 165,835, Mar. 9, 1988, abandoned.

[30] Foreign Application Priority Data

Mar. 9, 1987 [JP] Japan ................................. 62-51885
Mar. 9, 1987 [JP] Japan ................................. 62-51886

[51] Int. Cl.$^5$ .............................................. H01G 9/02
[52] U.S. Cl. .................................. 252/62.2; 361/504; 361/505
[58] Field of Search ......................................... 252/62.2

[56] References Cited

U.S. PATENT DOCUMENTS

| | | | |
|---|---|---|---|
| 4,206,088 | 6/1980 | Inoue | 252/62.2 |
| 4,373,176 | 2/1983 | Finkelstein | 252/62.2 |
| 4,377,692 | 3/1983 | Barry | 252/62.2 |
| 4,715,976 | 12/1987 | Mori | 252/62.2 |
| 4,762,630 | 8/1988 | Shinozaki et al. | 252/622 |

*Primary Examiner*—Prince Willis, Jr.
*Assistant Examiner*—Thomas Steinberg
*Attorney, Agent, or Firm*—James F. Haley, Jr.; John R. Storella

[57] ABSTRACT

An electrolyte for an electrolytic capacitor is disclosed, containing a carboxylic acid salt of a cationic nitrogen-containing heterocyclic compound as solute within an aprotic solvent or a mixed solvent comprising major aprotic solvent and minor polyol solvent.

12 Claims, No Drawings

HETEROCYCLIC ELECTROLYTE SALTS FOR ELECTROLYTIC CAPACITORS

FIELD OF THE INVENTION

This is a continuation of application Ser. No. 330,605 now abandoned, filed Mar. 29, 1989, now abandoned, and a continuation-in-part of application Ser. No. 165,835, filed Mar. 9, 1988, now abandoned, entitled "Electrolyte For Electrolytic Capacitor."

The present invention relates to an electrolyte of high conductivity for an electrolytic capacitor containing a carboxylic acid salt of a cationic nitrogen-containing heterocyclic compound as the solute.

An electrolyte for an electrolytic capacitor according to the present invention may conveniently be prepared in such a way that pyrrolidinium hydrogensulfate, piperidinium hydrogensulfate or pyridinium hydrogensulfate is dissolved in a solvent such as methyl acetate or methyl chloride, and an equivalent amount of the desired carboxylic acid is added, then a hydroxyalkali metal in two equivalent amounts is added to react, the precipitate is removed. The anhydrous salt is obtained by drying under vacuum and the resulting salt is dissolved in a specific solvent in a concentration at which a desired conductivity may be obtained.

BACKGROUND OF THE INVENTION

Conventionally, organic acids such as adipic acid or salts thereof being dissolved in polyols such as ethylene glycol are used for an electrolyte for an electrolytic capacitor.

The electrolyte is inserted between a dielectric layer of an anode electrode and a current collector cathode electrode to provide a series resistance of an electrolytic capacitor. Accordingly, when the conductivity of the electrolyte is low, an equivalent series resistance within an electrolytic capacitor is increased creating a high-frequency characteristic and a poor loss characteristic. The latest increase in demand for electrolytic capacitors having higher electric characteristics has not been satisfied with the conductivity of the presently available electrolytes. Especially in the case of the presently available electrolytes, a desired conductivity is difficult to obtain by using a solute in a sufficiently high concentration, thus the conductivity has been inevitably improved by intentionally adding water. The addition of water causes a decrease in the stability of the electric capacitor at high temperatures. Accordingly, an electrolyte having a high conductivity and stability is needed.

SUMMARY OF THE INVENTION

Thus, an object of the present invention is to provide an electrolyte of a non water or substantially non water system having high conductivity to improve electric characteristics of an electrolytic capacitor and to improve the reliability of an electric capacitor by maintaining stable characteristics for a long period.

Accordingly, the present invention provides an electrolyte for an electrolytic capacitor containing a carboxylic acid salt of a cationic nitrogen-containing heterocyclic compound within an aprotic solvent or a mixed solvent comprising a major aprotic solvent and a minor polyol solvent, said cationic nitrogen-containing heterocyclic compound having a 5- or 6-membered heterocyclic ring containing one nitrogen atom.

PREFERRED EMBODIMENTS OF THE INVENTION

The carboxylic acid salt of the cationic nitrogen-containing heterocyclic compound of the present invention is preferably a carboxylic acid salt of a pyrrolidinium compound having a general formula:

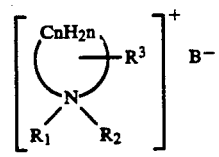

(wherein R1 and R2 are alkyl groups having 1–6 carbon atoms or a phenyl group, R3 is hydrogen atom or an alkyl group having 1–6 carbon atoms, B is carboxylic acid anion, and n is 4).

Alternatively, the carboxylic salt of the cationic nitrogen-containing heterocyclic compound of the present invention may preferably be a carboxylic acid salt of a piperidinium compound having a general formula:

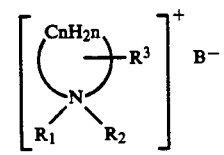

(wherein R1 and R2 are alkyl groups having 1–6 carbon atoms or a phenyl group, R3 is hydrogen atom or an alkyl group having 1–6 carbon atoms, B is carboxylic acid anion, and n is 5).

Alternatively, the carboxylic salt of the cationic nitrogen-containing heterocyclic compound of the present invention may preferably be a carboxylic acid salt of a pyridinium compound having a general formula:

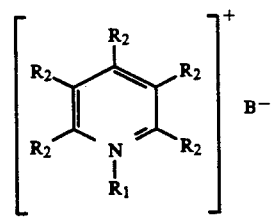

(wherein R1 is an alkyl group, an alkenyl group having 1–6 carbon atoms or aryl group, R2 is hydrogen atom, an alkyl group having 1–6 carbon atoms or aryl group and, B is a carboxylic acid anion).

The pyrrolidinium compound of the present invention includes, for example, N,N-dimethylpyrrolidinium, N,N-diethylpyrrolidinium, N,N-methylethylpyrrolidinium, N,N-methylphenylpyrrolidinium, N,N-dimethyl-2-methylpyrrolidinium and N,N-dimethyl-3-methylpyrrolidinium.

The piperidinium compound of the present invention includes, for example, N,N-dimethylpiperidinium, N,N-methylethylpiperidinium, N,N-diethylpiperidinium, N,N-methylphenylpiperidinium, N,N-dimethyl-2-methylpiperidinium and N,N-dimethyl-3-methylpiperidinium.

The pyridinium compound of the present invention may include, for example, N-methylpyridinium, N-ethylpyridinium, N-propenylpyridinium, N-phenylpyridinium, N-methyl-2-methylpyridinium, N-methyl-3-methylpyridinium, N-methyl-4-pyridinium, N-ethyl-2,6-dimethylpyridinium, N-ethyl-2,5-dimethylpyridinium, N-phenyl-2,4-dimethylpyridinium, N-methyl-4-phenylpyridinium and N-methyl-3-propenylpyridinium.

Preferably, the carboxylic acid of the present invention is selected from the group consisting of hydroxy carboxylic acids such as glycolic acid, lactic and malic acid; saturated aliphatic monocarboxylic acids such as formic acid, acetic acid, propionic acid and pivalic acid; and fumaric acid.

The aprotic solvent to be used in the present invention may be selected from the group consisting of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile, and mixtures thereof.

The polyol solvent to be used in the present invention may be selected from a group consisting of ethylene glycol, propylene glycol, diethylene glycol, hexylene glycol, phenyl glycol, glycerol, erythritol, hexitol and a mixture thereof. These polyols are added in a minimum amount for use in the case of obtaining a desired electrolyte having a high conductivity which may not be obtained with the use of an aprotic solvent alone. Generally, these are added to an electrolyte in a concentration up to 30% by weight.

An electrolyte of the present invention is prepared in such a way that pyrrolidinium hydrogensulfate, piperidinium hydrogensulfate or pyridinium hydrogensulfate is dissolved in a solvent such as methyl acetate or methyl chloride, and the desired carboxylic acid in an equivalent amount is added, then a hydroxyalkali metal in two equivalent amount is added to react, the precipitate is removed. The anhydrous salt is obtained by drying under vacuum, the resulting salt is dissolved in a specific solvent in a concentration at which a desired conductivity may be obtained. An electrolyte for electrolytic capacitor according to the present invention will be exemplified in the following.

Fifteen percent by weight solutions of several carboxylic acid salts of pyrrolidinium, piperidinium or pyridinium compounds dissolved in several solvents were prepared by the general preparation procedure as described in the foregoing for examples of the electrolyte for an electrolytic capacitor of the present invention. Their conductivities are shown in Table 1. A conventional standard electrolyte ethylene glycol 78% by weight, water 10% by weight, ammonium adipate 12% by weight) is also shown for comparison.

TABLE 1

| Example | Composition of electrolyte | Concentration | Conductivity |
|---|---|---|---|
| 1 | γ-butyrolactone | 75 | 14.7 |
|   | ethylene glycol | 10 | |
|   | N,N-dimethyl-pyrrolidinium formate | 15 | |
| 2 | γ-butyrolactone | 75 | 8.6 |
|   | ethylene glycol | 10 | |
|   | N,N-dimethyl-pyrrolidinium propionate | 15 | |
| 3 | γ-butyrolactone | 75 | 8.9 |
|   | ethylene glycol | 10 | |
|   | N,N-dimethyl-pyrrolidinium pivalate | 15 | |
| 4 | γ-butyrolactone | 75 | 10.5 |
|   | ethylene glycol | 10 | |
|   | N,N-dimethyl-pyrrolidinium glycolate | 15 | |
| 5 | γ butyrolactone | 75 | 8.6 |
|   | ethylene glycol | 10 | |
|   | N,N-dimethyl-pyrrolidinium malate | 15 | |
| 6 | N,N-dimethylformamide | 75 | 20.0 |
|   | ethylene glycol | 10 | |
|   | N,N-dimethyl-pyrrolidinium formate | 15 | |
| 7 | N,N-dimethylformamide | 75 | 14.9 |
|   | ethylene glycol | 10 | |
|   | N,N-dimethyl-pyrrolidinium glycolate | 15 | |
| 8 | N-methylformamide | 85 | 18.9 |
|   | N,N-dimethyl-pyrrolidinium propionate | 15 | |
| 9 | N-methylformamide | 85 | 19.6 |
|   | N,N-dimethyl-pyrrolidinium malate | 15 | |
| 10 | N-methylformamide | 85 | 14.3 |
|   | N,N-dimethyl-pyrrolidinium fumarate | 15 | |
| 11 | γ-butyrolactone | 75 | 15.9 |
|   | ethylene glycol | 10 | |
|   | N,N-dimethyl-piperidinium formate | 15 | |
| 12 | γ-butyrolactone | 75 | 9.8 |
|   | ethylene glycol | 10 | |
|   | N,N-dimethyl-piperidinium propionate | 15 | |
| 13 | γ-butyrolactone | 75 | 10.2 |
|   | ethylene glycol | 10 | |
|   | N,N-dimethyl-piperidinium pivalate | 15 | |
| 14 | γ-butyrolactone | 75 | 11.7 |
|   | ethylene | 10 | |

TABLE 1-continued

| Example | Composition of electrolyte | Concentration | Conductivity |
|---|---|---|---|
|  | glycol |  |  |
|  | N,N-dimethyl-piperidinium glycolate | 15 |  |
| 15 | γ-butyrolactone | 75 | 9.9 |
|  | ethylene glycol | 10 |  |
|  | N,N-dimethyl-piperidinium malate | 15 |  |
| 16 | N,N-dimethylformamide | 75 | 21.3 |
|  | ethylene glycol | 10 |  |
|  | N,N-dimethyl-piperidinium formate | 15 |  |
| 17 | N,N-dimethylformamide | 75 | 20.0 |
|  | ethylene glycol | 10 |  |
|  | N,N-dimethyl-piperidinium lactate | 15 |  |
| 18 | N-methylformamide | 85 | 20.1 |
|  | N,N-dimethyl-piperidinium propionate | 15 |  |
| 19 | N-methylformamide | 85 | 21.7 |
|  | N,N-dimethyl-piperidinium malate | 15 |  |
| 20 | N-methylformamide | 85 | 15.5 |
|  | N,N-dimethyl-piperidinium fumarate | 15 |  |
| 21 | γ-butyrolactone | 75 | 20.1 |
|  | ethylene glycol | 10 |  |
|  | N-methylpyridinium formate | 15 |  |
| 22 | N-methylformamide | 85 | 19.7 |
|  | N-methylpyridinium malate | 15 |  |
| 23 | N-methyl-2-pyrrolidone | 85 | 10.1 |
|  | N,N-methyletyl-2-methylpyrrolidinium glycolate | 15 |  |
| 24 | acetonitrile | 55 | 20.1 |
|  | ethylene glycol | 30 |  |
|  | N,N-methylphenyl-pyrrolidinium acetate | 15 |  |
| 25 | N-methyl-2-pyrrolidone | 85 | 9.3 |
|  | N,N-dimethyl-2 piperidinium glycolate | 15 |  |
| 26 | N-methyl-2-pyrrolidone | 85 | 8.2 |
|  | N-methyl-2-phenylpyridium-glycolate | 15 |  |
| 27 | Acetonitrile | 55 | 15.4 |
|  | ethylene glycol | 30 |  |
|  | N-phenyl-2,6-dimethylpyridinium acetate | 15 |  |
| Comparative | ethylene glycol | 78 | 6.7 |

TABLE 1-continued

| Example | Composition of electrolyte | Concentration | Conductivity |
|---|---|---|---|
| tive | water | 10 |  |
|  | ammonium adipate | 12 |  |

As will be understood from the results as hereinbefore described, the electrolyte of the present invention possesses a high conductivity as compared with the conventional ones, enabling the selection of wide range conductivity.

Electrolytic capacitors were then made using these electrolytes to compare their properties.

Electrolytic capacitors were made in such a way that aluminum foil is used for both the anode and the cathode to make a cylindrical capacitor element. Separator paper is inserted so as to superpose the aluminum foil before rolling. The capacitor element is impregnated with electrolytes of any example and is introduced into an external case and sealed.

The results were obtained as mean values from ten individual determinations using the same capacitor element, rated voltage 16 V and rated capacity 47 μF.

The following Table 2 shows their initial values and electrostatic capacity (CAP), tangential loss angle (tan δ) and leakage current (LC) (value at 2 minutes) after 1000 hours operation at 110° C. with the rated voltage.

TABLE 2

| Example | Initial Value | | | After 1000 Hours | | |
|---|---|---|---|---|---|---|
|  | CAP (μF) | TAN δ | LC (μA) | CAP Δ(%) | TAN Δ | LC (μA) |
| 1 | 63.2 | 0.058 | 0.35 | −1.8 | 0.067 | 0.23 |
| 2 | 63.1 | 0.070 | 0.42 | −0.1 | 0.081 | 0.18 |
| 3 | 63.1 | 0.069 | 0.33 | −1.5 | 0.079 | 0.33 |
| 5 | 63.1 | 0.070 | 0.40 | −2.3 | 0.081 | 0.31 |
| 6 | 65.5 | 0.040 | 0.38 | −5.1 | 0.054 | 0.27 |
| 7 | 63.2 | 0.059 | 0.32 | −7.2 | 0.080 | 0.19 |
| 8 | 63.3 | 0.047 | 0.29 | −5.0 | 0.044 | 0.23 |
| 9 | 65.5 | 0.040 | 0.37 | −5.0 | 0.044 | 0.23 |
| 10 | 63.2 | 0.059 | 0.22 | −4.1 | 0.065 | 0.30 |
| 11 | 63.2 | 0.055 | 0.29 | −2.0 | 0.064 | 0.29 |
| 12 | 63.1 | 0.066 | 0.41 | −1.2 | 0.076 | 0.17 |
| 13 | 63.1 | 0.065 | 0.33 | −1.3 | 0.075 | 0.24 |
| 14 | 63.1 | 0.064 | 0.34 | −3.5 | 0.074 | 0.24 |
| 15 | 63.1 | 0.065 | 0.30 | −5.7 | 0.075 | 0.31 |
| 16 | 65.5 | 0.039 | 0.20 | −5.3 | 0.053 | 0.30 |
| 17 | 63.2 | 0.054 | 0.27 | −7.7 | 0.073 | 0.32 |
| 20 | 63.2 | 0.057 | 0.31 | −0.7 | 0.063 | 0.26 |
| 22 | 65.4 | 0.040 | 0.35 | −3.6 | 0.046 | 0.27 |
| 23 | 63.2 | 0.068 | 0.35 | −5.2 | 0.082 | 0.31 |
| 24 | 65.7 | 0.046 | 0.30 | −2.2 | 0.061 | 0.26 |
| 25 | 63.1 | 0.070 | 0.33 | −4.7 | 0.084 | 0.27 |
| 26 | 63.2 | 0.072 | 0.40 | −6.4 | 0.087 | 0.31 |
| 27 | 65.3 | 0.056 | 0.35 | −2.8 | 0.083 | 0.38 |
| Comparative | 63.0 | 0.076 | 0.43 | −12.1 | 0.110 | 0.38 |

As will be understood from the results above, the electrolytes for electrolytic capacitor of the present invention have lower capacitor losses or (tan δ) as compared with the conventional ones owing to their higher conductivity.

Furthermore, ethylene glycol may be used as a solvent without any abnormal exterior owing to the increase of the internal pressure, and without any decrease of the electrostatic capacity, being used at an extent of 30% by weight against the electrolyte even in the load situation at a high temperature. The electrolytes of the present invention show very little change in the characteristic values in comparison of the initial value with the value after 1000 hours.

The electrolyte according to the present invention may provide an electrolytic capacitor for use in power devices such as switching regulators used at high frequency and requiring high efficiency, and for various electrical machineries and apparatus for long term use at high temperature because of its ability to maintain lower capacitor losses and stability at high temperature for long periods.

What is claimed is:

1. An electrolyte for an electrolytic capacitor containing a carboxylic acid salt of a cationic nitrogen-containing heterocyclic compound within an aprotic solvent or a mixed solvent comprising a major aprotic solvent and a minor polyol solvent, said cationic nitrogen-containing heterocyclic compound having a 5- or 6-membered heterocyclic ring containing one nitrogen atom, characterized in that the carboxylic acid employed as the anion is a hydroxycarboxylic acid selected from the group consisting of glycolic acid, lactic acid and malic acid; and in that the nitrogen-containing heterocyclic compound employed as the cation is selected from the group consisting of pyrrolidinium, compounds piperidinium compounds, and pyridinium compounds.

2. An electrolyte for an electrolytic capacitor according to claim 1, wherein the carboxylic acid salt of the cationic nitrogen-containing heterocyclic compound is a carboxylic acid salt of a pyrrolidinium compound having a general formula:

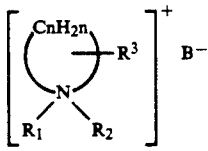

(wherein R1 and R2 are alkyl groups having 1-6 carbon atoms or a phenyl group; R3 is a hydrogen atom or an alkyl group having 1-6 carbon atoms, B is a carboxylic acid anion; and n is 4).

3. An electrolyte for an electrolytic capacitor according to claim 1, wherein the carboxylic acid salt of the cationic nitrogen-containing heterocyclic compound is a carboxylic acid salt of a piperidinium compound having a general formula:

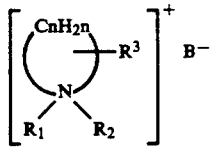

(wherein R1 and R2 are alkyl groups having 1-6 carbon atoms or a phenyl group R3 is a hydrogen atom or an alkyl group having 1-6 carbon atoms; B is a carboxylic acid anion; and n is 5).

4. An electrolyte for an electrolytic capacitor according to claim 1, wherein the carboxylic acid salt of the cationic nitrogen-containing heterocyclic compound is a carboxylic acid salt of a pyridinium compound having a general formula:

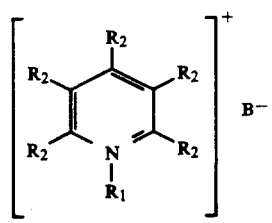

(wherein R1 is an alkyl group, an alkenyl group having 1-6 carbon atoms or an aryl group; R2 is a hydrogen atom, an alkyl group having 1-6 carbon atoms or an aryl group; and B is a carboxylic acid anion).

5. An electrolyte for an electrolytic capacitor according to claim 1, wherein the aprotic solvent is selected from a group consisting of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile and mixtures thereof.

6. An electrolyte for an electrolytic capacitor according to claim 1, wherein the polyol solvent is selected from the group consisting of ethylene glycol, propylene glycol, diethylene glycol, hexylene glycol, phenyl glycol, glycerol, erythritol, hexitol and mixtures thereof.

7. An electrolyte for an electrolytic capacitor containing a carboxylic acid salt of a cationic nitrogen-containing heterocyclic compound within an aprotic solvent or a mixed solvent comprising a major aprotic solvent and a minor polyol solvent, said cationic nitrogen-containing heterocyclic compound having a 5- or 6-membered heterocyclic ring containing one nitrogen atom, characterized in that the carboxylic acid employed as the anion is selected from the group consisting of fumaric acid and saturated aliphatic monocarboxylic acids selected rom the group consisting of formic acid, acetic acid, propionic acid and pivalic acid; and in that the nitrogen-containing heterocyclic compound employed as the cation is selected from the group consisting of pyrrolidinium compounds, piperidinium compounds, and pyridinium compounds.

8. An electrolyte for an electrolytic capacitor according to claim 7, wherein the carboxylic acid salt of the cationic nitrogen-containing heterocyclic compound is a carboxylic acid salt of a pyrrolidinium compound having a general formula:

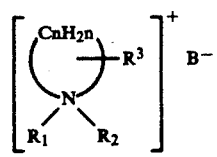

(wherein R1 and R2 are alkyl groups having 1-6 carbon atoms or a phenyl group; R3 is a hydrogen atom or an alkyl group having 1-6 carbon atoms; B is a carboxylic acid anion; and n is 4).

9. An electrolyte for an electrolytic capacitor according to claim 7, wherein the carboxylic acid salt of the cationic nitrogen-containing heterocyclic compound is a carboxylic acid salt of a piperidinium compound having a general formula:

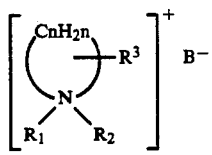

(wherein R1 and R2 are alkyl groups having 1–6 carbon atoms; R3 is a hydrogen atom or an alkyl group having 1–6 carbon atoms; B is a carboxylic acid anion; and n is 5).

10. An electrolyte for an electrolytic capacitor according to claim 7, wherein the carboxylic acid salt of the cationic nitrogen-containing heterocyclic compound is a carboxylic acid salt of a pyridinium compound having a general formula:

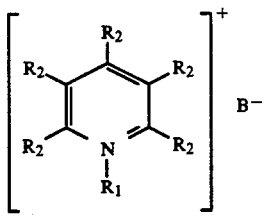

(wherein R1 is an alkyl group, an alkenyl group having 1–6 carbon atoms or an aryl group; R2 is a hydrogen atom, an alkyl group having 1–6 carbon atoms or an aryl group; and B is a carboxylic acid anion).

11. An electrolyte for an electrolytic capacitor according to claim 7, wherein the aprotic solvent is selected from a group consisting of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile and mixtures thereof.

12. An electrolyte for an electrolytic capacitor according to claim 7, wherein the polyol solvent is selected from the group consisting of ethylene glycol, propylene glycol, diethylene glycol, hexylene glycol, phenyl glycol, glycerol, erythritol, hexitol and mixtures thereof.

* * * * *